April 14, 1931.    J. MITCHELL ET AL    1,800,896
EXTERNAL COVERING OR COATING OF IRON OR STEEL
PIPES AND OTHER CYLINDRICAL BODIES
Filed Sept. 14, 1929
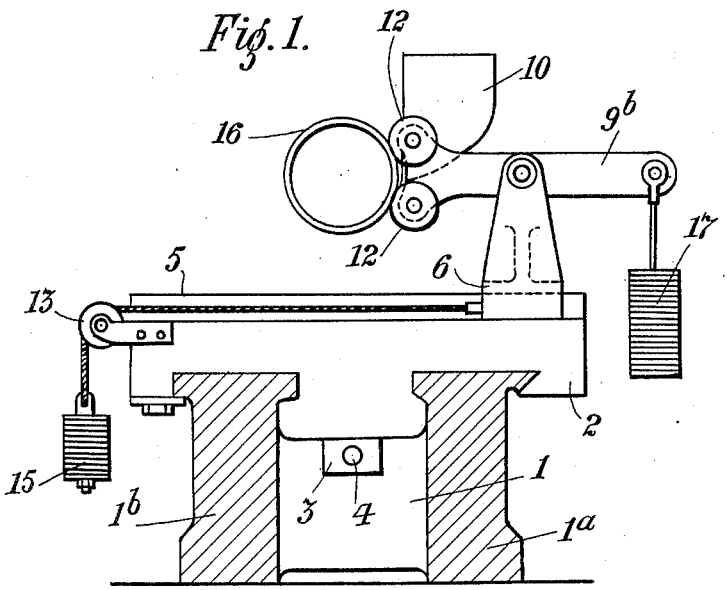
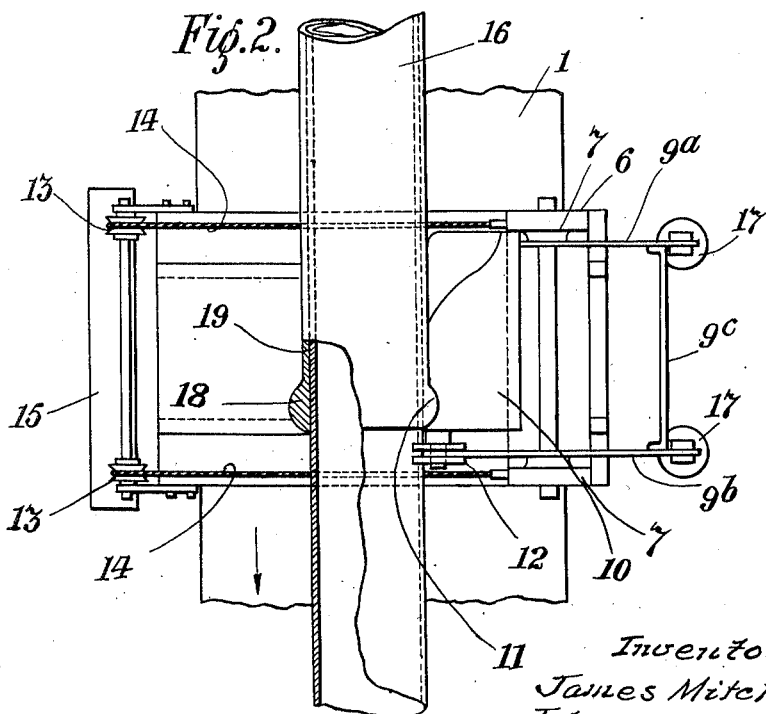

Patented Apr. 14, 1931

1,800,896

UNITED STATES PATENT OFFICE

JAMES MITCHELL AND JOHN HUTCHINSON SMITH, OF COATBRIDGE, SCOTLAND, ASSIGNORS TO STEWARTS & LLOYDS LIMITED, OF GLASGOW, SCOTLAND

EXTERNAL COVERING OR COATING OF IRON OR STEEL PIPES AND OTHER CYLINDRICAL BODIES

Application filed September 14, 1929, Serial No. 392,696, and in Great Britain September 24, 1928.

This invention relates to the coating externally of iron and steel pipes or other hollow bodies (hereinafter referred to as "pipes") with a protective material such as a bituminous or coal tar pitch composition.

According to the present invention, pipes are coated externally by feeding coating material in the consistency of a mastic on to the pipe, while it is in rotation, in such a way as to build up the coating material as a continuous mass of spiral form on the pipe wall, and pressing down the convolutions as they are applied so as to spread and smooth over the material to form a seamless covering.

The coating material must be such that it can be brought to a dough-like consistency, not sufficiently liquid to run but capable of being spread by mechanical means on the pipe surface, which may be heated before coating or painted with a bituminous paint to improve adhesion.

The invention is carried out in apparatus comprising longitudinally movable feed means adapted, as it progresses along the length of a rotating pipe, to feed out coating material, so that it is built up as a continuous mass of spiral form, and means, following the part of the feed means whence the coating material issues, for pressing down the convolutions as they are applied so as to spread and smooth over the material to form a seamless covering.

In order that the invention may be clearly understood, one embodiment thereof will be described by way of example and with reference to the accompanying drawing whereon:

Fig. 1 is an end elevation of apparatus for coating pipes in accordance with the invention, and Fig. 2 is a corresponding plan view.

Referring to the drawing, the numeral 1 denotes the frame of the apparatus comprising two longitudinal slide ways $1^a$, $1^b$. A carriage 2 is slidable on the slide ways, being grooved for this purpose. On its under side the carriage 2 is provided with a nut 3 with which a screw threaded feed shaft 4 engages, the shaft being connected to a driving motor (not shown).

The carriage 2 is provided with transverse slide ways 5 on which a second carriage 6 is slidable. This carriage 6 has two spaced uprights 7, 7 in which is pivoted a frame comprising two transverse levers $9^a$, $9^b$ joined together by a rail $9^c$.

These two levers support between them a hopper 10 whose lower part is wedge-shaped. One wall of the hopper near its bottom is slightly concave or part-cylindrical to form a kind of scoop. Near one end of the hopper, this wall is recessed at 11, the recessed part having a curved surface. A discharge orifice (not shown) is provided in the hopper wall at this recess.

One of the hopper supporting levers $9^b$ is extended and bifurcated to carry two spaced rollers 12, 12.

The carriage 2 has two pulleys 13 at one side over which ropes 14, attached on the one hand to the second carriage 6 and on the other to weights 15, pass so that the carriage 6 tends to slide to the left in the drawing.

The apparatus is provided with a head stock and a tail stock (not shown) similar to those of a lathe and by means of which a pipe 16 to be coated can be rotated about its longitudinal axis. When the pipe is in position, the weights 16 cause the rollers 12 to bear against the pipe wall as shown. The hopper supporting levers $9^a$, $9^b$ are counter-weighted at 17 so that the hopper tends to rise but is prevented from doing so by the rollers 12.

The process of coating a pipe is as follows:

Coating material is kept in the hopper at the consistency of a mastic, not sufficiently liquid to run but capable of being spread by mechanical means. The hopper may have heating means such as electrical resistance elements or a steam coil in it, together with stirring means.

The hopper is started from one end of the pipe, which has been previously heated and is in rotation, and is moved along in the direction of the arrow in Fig. 2, feeding out the coating material which is built up by the recess 11 in a spiral mass indicated in Fig. 2 at 18. As fast as this spiral mass is built up it is pressed down by the sloping trailing edge of the recess 11 and smoothed over and spread to form a seamless covering 19 by the part-cylindrical scoop portion of the hopper wall which is kept resiliently bearing against the pipe covering.

Should the pipe be not quite straight or be so long as to whip when rotated, the rollers 12 act as feelers and automatically maintain the hopper at a constant predetermined distance from the pipe, thus ensuring a uniform thickness of the covering.

The coating material may consists of 80% by weight of bitumen and 20% by weight of a fibrous material such as asbestos wool and should be brought before use to a temperature of about 400° to 450° F.

It is clear that other forms of apparatus may be used for coating pipes in accordance with the invention. In many cases an existing screw cutting lathe may be adapted for the purpose, the slide rest carrying the hopper. Further the pressing and smoothing means may be separate from the hopper.

We claim:—

1. A method of externally coating pipes by resiliently pressing coating material in the consistency of a mastic onto the pipe so as to effect a frictional grip between said pipe and material, drawing out and winding on the pipe a ribon of said material by the rotation of said pipe in contact therewith, spreading the wound material over the pipe wall, and consolidating the spread material on said wall by a rubbing action axially of the pipe.

2. A method of externally coating pipes by resiliently pressing coating material in the consistency of a mastic onto the pipe so as to effect a frictional grip between said pipe and material, drawing out and winding on the pipe a ribbon of said material by the rotation of said pipe in contact therewith, spreading the wound material over the pipe wall so as to form a belt of mastic round the pipe of greater thickness than the final coating, and consolidating the spread material on the pipe wall by a rubbing action on the belt of mastic directed toward and along the axis of the pipe.

3. A method of externally coating pipes by heating the pipe to be coated, holding coating material in resilient contact with the pipe so as to effect a frictional grip between said pipe and material, drawing out and winding on the pipe a ribon of said material by rotation of said pipe while resiliently holding the mass of said material at the side of said pipe, building up a belt of mastic at the leading edge of said ribbon, spreading out said belt so as to force said material toward and along the axis of the pipe, and finally smoothing the spread material into a seamless coating of uniform thickness.

4. A method of externally coating pipes by painting the pipes to be coated with a bituminous paint, exerting a constant pull on a mass of coating material so as to keep said material in frictional contact with the pipe wall, drawing out and winding on the pipe a ribbon of said material by the rotation of said pipe in contact therewith, spreading the wound material over the pipe wall, and consolidating the spread material on said wall by a rubbing action axially of the pipe.

5. Apparatus for externally coating pipes comprising a combined feeder and spreader device containing coating material in the consistency of a mastic, a balanced support for holding said combined feeder and spreader device at the side of the pipe, a resilient press device for maintaining the feeder and spreader device against the pipe to ensure frictional grip between the pipe wall and coating material, and means for rotating said pipe so that said material is drawn out of said feeder and spreader device and wound helically round the pipe wall.

6. Apparatus for externally coating pipes comprising a combined feeder and spreader device containing coating material in the consistency of a mastic, means resiliently holding the outlet of said feeder and spreader device against the pipe, means for rotating the pipe in frictional contact with said coating material so as thereby to draw out a ribbon of said material from said outlet and wind said ribbon on the pipe, an arcuate channel member adapted to build up a belt of mastic at the leading edge of said ribbon, mechanism for moving the feeder and spreader device with the arcuate channel member longitudinally of the pipe, means following the arcuate channel member so that the convolutions of coating material spread thereby on the pipe are consolidated and smoothed down, and means for automatically maintaining a uniform thickness of the coating.

7. Apparatus for externally coating pipes comprising a hopper for containing coating material in the consistency of a mastic, an outlet orifice in said hopper, a gravity-acting device for holding said orifice against the pipe, mechanism for moving the hopper longitudinally, means for rotating the pipe about its longitudinal axis, a recessed part in the hopper at the outlet orifice by means of which coating material fed during longitudinal movement of the hopper from the orifice onto the pipe is built up as condensed mass of spiral form on the pipe, and a curved surface at the trailing end of the recessed part which presses down the convolutions as they are applied, and spreads and smooths over the material to form a seamless covering.

In testimony whereof we affix our signatures.

JAMES MITCHELL.
JOHN H. SMITH.